United States Patent
Stern et al.

(10) Patent No.: US 11,453,729 B2
(45) Date of Patent: Sep. 27, 2022

(54) REVERSIBLY CROSSLINKED CELLULOSE ETHERS AND PROCESS FOR THE PRODUCTION THEREOF BY SELECTIVE OXIDATION OF VICINAL OH GROUPS

(71) Applicant: SE Tylose GmbH & Co. KG, Weisbaden (DE)

(72) Inventors: Roland Stern, Wiesbaden (DE); Mike Kleinert, Mainz (DE); Rudolf Ehrler, Flörsheim (DE)

(73) Assignee: SE Tylose GmbH & Co. KG, Wiesbaden (DE)

(*) Notice: Subject to any disclaimer, the term of this patent is extended or adjusted under 35 U.S.C. 154(b) by 0 days.

(21) Appl. No.: 14/991,771

(22) Filed: Jan. 8, 2016

(65) Prior Publication Data

US 2016/0215069 A1 Jul. 28, 2016

(30) Foreign Application Priority Data

Jan. 23, 2015 (DE) .......................... 102015000795.5

(51) Int. Cl.
 *C08B 11/20* (2006.01)
 *C08B 11/193* (2006.01)
(52) U.S. Cl.
 CPC ........... *C08B 11/193* (2013.01); *C08B 11/20* (2013.01)
(58) Field of Classification Search
 CPC .......... C08B 11/20; C08B 11/12; C08B 11/22
 USPC ..... 536/85, 89, 90, 91, 95, 96, 98, 100, 124
 See application file for complete search history.

(56) References Cited

U.S. PATENT DOCUMENTS

| | | | | |
|---|---|---|---|---|
| 2,415,039 A | * | 1/1947 | Rust ......................... | C08B 11/04 106/198.1 |
| 2,879,268 A | | 3/1959 | Jullander | |
| 3,052,511 A | * | 9/1962 | Reinhardt ................ | C08B 11/00 28/168 |
| 3,297,583 A | | 1/1967 | Dierichs et al. | |
| 3,376,285 A | | 4/1968 | Callihan et al. | |
| 3,519,691 A | * | 7/1970 | Hans ........................ | C07C 41/56 560/238 |
| 3,619,451 A | * | 11/1971 | Gill .......................... | B24C 3/14 264/109 |
| 3,879,365 A | * | 4/1975 | Greminger, Jr. ........ | C08F 14/06 526/200 |
| 4,013,821 A | * | 3/1977 | Engelskirchen ....... | C08B 11/193 106/176.1 |
| 4,082,743 A | * | 4/1978 | Hearon .................... | C08B 15/02 536/30 |
| 4,136,038 A | * | 1/1979 | Pracht ..................... | C11D 3/225 510/283 |
| 4,675,394 A | | 6/1987 | Solarek et al. | |
| 5,294,448 A | * | 3/1994 | Ring ....................... | A61K 9/286 424/475 |
| 8,580,951 B2 | | 11/2013 | Lu et al. | |

FOREIGN PATENT DOCUMENTS

| | | |
|---|---|---|
| DE | 1 518 213 | 5/1969 |
| DE | 1 719 445 | 6/1970 |
| EP | 0 232 851 A2 | 8/1987 |
| EP | 1 452 544 A1 | 9/2004 |
| WO | WO 2003/097700 A1 | 11/2003 |
| WO | WO 2004/024775 A1 | 3/2004 |

OTHER PUBLICATIONS

Kondo et al ("Preparation of Aldehydrocelluloses from Completely Allylated Methylcellulose, Allylated Ethylcellulose, and Tri-O-Allylcellulose by Ozonization", Journal of Applied Polymer Science, vol. 35, pp. 885-893 (1988)).*

Heiko Thielking, et al., Cellulose Ethers, Ullmann's Encyclopedia of Industrial Chemistry, 2006, Wiley-VCH Verlag GmbH, Weinheim, Germany.

A. A. Sarymsakov et al., Uzbekskii Khimicheskii Zhumal, 1975, vol. 19(5), pp. 45-48.

* cited by examiner

*Primary Examiner* — Shaojia A Jiang
*Assistant Examiner* — Everett White
(74) *Attorney, Agent, or Firm* — ProPat, LLC; Cathy R. Moore

(57) ABSTRACT

Reversibly crosslinked, water-soluble cellulose ethers having at least two different ether components is disclosed. At least one ether component is an alkyl, hydroxyalkyl or carboxymethyl group and at least one is an alkyl group having an aldehyde function which forms hydrolyzable hemiacetals with free OH groups of the cellulose ether. The cellulose ethers are obtainable by selective oxidation of cellulose ethers containing alkyl groups having vicinal OH groups (glycol cleavage). Preferably, water-soluble cellulose ethers are co-etherified simultaneously or subsequently with 2,3-epoxypropanol (glycidol) or 3-chloro-1,2-propanediol and the 2,3-dihydroxypropyl ether groups converted entirely or partly into 2-oxoethyl ether groups by oxidation. Suitable oxidants include periodate, periodic acid or lead tetraacetate. After washing and drying, cellulose ethers reversibly crosslinked via hemiacetals can be dispersed in water or aqueous solutions, going into solution homogeneously with a time delay. No low molecular weight dialdehydes or other problematical crosslinking reagents are liberated on dissolution.

27 Claims, No Drawings

REVERSIBLY CROSSLINKED CELLULOSE ETHERS AND PROCESS FOR THE PRODUCTION THEREOF BY SELECTIVE OXIDATION OF VICINAL OH GROUPS

CROSS-REFERENCE TO RELATED APPLICATIONS

This application claims priority to German Patent Application No. 10 2015 000 795.5 filed Jan. 23, 2015, which is hereby incorporated herein by reference in its entirety.

FIELD OF THE INVENTION

The present invention relates to reversibly crosslinked, delayed-dissolution cellulose ethers and also a process for the production thereof without the use of low molecular weight, bifunctional or multifunctional crosslinkers which can be liberated during the dissolution process.

BACKGROUND OF THE INVENTION

Cellulose ethers are used in many applications as auxiliaries for thickening, dispersing and stabilizing preferably aqueous solutions and dispersions.

The preparation of cellulose ethers having uniform or different substituents is known, see, for example "Cellulose Ethers". Ullmann's Encyclopedia of Industrial Chemistry, Wiley-VCH Verlag GmbH, Weinheim, Germany.

To prepare these cellulose ethers, e.g. methyl cellulose, ethyl cellulose, carboxymethyl hydroxyethyl cellulose, hydroxypropyl cellulose, methyl hydroxyethyl cellulose, methyl hydroxypropyl cellulose, ethyl hydroxyethyl cellulose, carboxymethyl hydroxyethyl cellulose and carboxymethyl hydroxypropyl cellulose, the starting material, namely cellulose, is usually milled to increase its surface area; here, the particle size should generally be less than 2.5 mm, frequently even less than 1.0 mm. The resulting, voluminous, cellulose powder is suspended in a suitable suspension medium in which the resulting cellulose ether is also insoluble, depending on the type of ether, use is made for this purpose of, for example, water, water/alcohol mixtures or else organic solvents, and converted into "alkali metal cellulose" by addition of base, e.g. NaOH, KOH, LiOH and/or $NH_4OH$, in solid or liquid form. This is followed, with or without isolation of the alkali metal cellulose, by a single-stage or multistage, continuous or batchwise etherification using the appropriate reagents, e.g. methyl chloride, ethyl chloride, 2-chloroacetic acid, ethylene oxide or propylene oxide. During the alkalization and etherification, the cellulose or the cellulose ether swells, as a result of which the accessibility for the etherification reagent is increased, but at no time goes into solution. This heterogeneous reaction is usually referred to as a slurry process. The resulting cellulose ethers are, depending on the type of ether, freed of reaction by-products in a known manner using hot water or suitable solvent mixtures, dried, milled and optionally blended with ether components.

Despite the in-principle good solubility of the cellulose ethers in cold water, the production of aqueous solutions thereof frequently presents a problem. This applies particularly when the cellulose ether is present as a fine powder. Untreated, i.e. uncrosslinked, cellulose ethers tend, in particular, on introduction into cold water or aqueous solutions, to form lumps, which makes the dissolution process of these in-principle readily water-soluble polymers much more difficult or sometimes virtually impossible. This can be attributed to the high affinity of the cellulose ethers or comparable hydrophilic cellulose derivatives with water. When stirred into water, a sticky gel layer, which represents a diffusion barrier, is formed on the surface of the pulverulent or granular polymer particles. Further water can penetrate only with great difficulty through this aqueous gel layer and can thus progress only very slowly into the interior of the polymer particles. As soon as gel-like lumps or agglomerates have formed on introduction of cellulose ethers into water, complete dissolution of the cellulose ethers to form a homogeneous solution is possible only by means of time-consuming and energy-intensive mixing processes.

The object of ensuring lump-free solubility of cellulose ethers is achieved industrially by reversible crosslinking of cellulose ether chains by means of short-chain dialdehydes such as glyoxal (prior art). Examples of processes which achieve improved solubility by the use of dialdehydes are disclosed in U.S. Pat. Nos. 2,879,268, 3,297,583, DE-B 1 719 445 and DE-A 1 518 213.

In the treatment with dialdehydes, the cellulose ether is reversibly crosslinked. For this purpose, free hydroxy groups of the cellulose ether are reacted with the aldehyde groups of the dialdehyde to form hemiacetal bonds. In this way, neighboring polymer chains are joined to one another or crosslinked intramolecularly and/or intermolecularly via covalent bonds. Above a sufficiently high crosslinking density, a modified cellulose ether which is initially insoluble and thus homogeneously dispersible on introduction into water is obtained. The hemiacetal bonds described are hydrolyzed in water or aqueous solutions to liberate the dialdehyde used, so that the cellulose ether overall goes into solution with a time delay but without lumps because of the well-dispersed cellulose ether particles in the aqueous medium. The duration of this dissolution delay can be set by the magnitude of crosslinking. After the delayed-dissolution cellulose ether has been dispersed, further components can be added to the solution so that a homogeneous solution, suspension or emulsion is present after complete dissolution of the cellulose ether. The dissolution process of the crosslinked cellulose ether can be accelerated by increasing the pH ("Cellulose Ethers", chapter 2.1., Ullmann's Encyclopedia of Industrial Chemistry, 2006, Wiley-VCH Verlag GmbH, Weinheim, Germany).

The dialdehydes which are used for reversible crosslinking and are liberated again on dissolution are reactive low molecular weight compounds which are toxicologically problematical. Thus, for example, the glyoxal used for preparing delayed-dissolution cellulose ethers industrially is usually classified as skin-sensitizing (category 1) and mutagenic (category 2) according to EU regulation No. 1272/2008 [CLP]. According to this regulation, preparations containing more than 0.1% of glyoxal, for example, have to be labeled with the warning EUH208 "Contains glyoxal. Can cause an allergic reaction."

Cellulose ethers whose dissolution has been delayed by means of glyoxal or analogous dialdehydes are therefore not permitted or advisable for use in medicaments, foodstuffs or cosmetics. In the case of industrial fields of use of cellulose ethers, e.g. building materials, paints, ceramics, etc., the toxicologically unproblematical nature of the auxiliaries used is becoming increasingly important.

EP 1 452 544 describes a process for preparing water-dispersible cellulose ethers having a reduced glyoxal content. According to this document, the amount of glyoxal required to set a desired dissolution delay can be reduced by addition of water-soluble aluminum salts and/or water-soluble borates. However, the reduction in the amount of glyoxal is only small and the aluminum and boron compounds additionally used are likewise toxicologically problematical.

To reduce the lump formation occurring in the preparation of cellulose ethers, cellulose ethers can also be treated with surfactants or slurried with a nonsolvent before stirring into water. The cellulose ether can optionally also be mixed with another solid before stirring into water, as a result of which the cellulose ether particles are separated physically from one another and thus display less tendency to form lumps. In the case of cellulose ethers which are insoluble in hot water, the cellulose ether can firstly be dispersed in hot water and then brought into solution without formation of lumps by cooling. Lump formation can also be countered by use of high-performance, fast-rotating stirring machines.

However, a person skilled in the art will know that these mechanical and/or physical solutions to the problem are frequently not able to be used, e.g. because of lack of equipment or a fixed formulation order, or often cannot be taken into consideration because of the associated additional outlay in terms of time, energy and/or personnel which has to be expended by the user, making the procedure uneconomical.

It would therefore be desirable to be able to prepare, with a justifiable outlay, reversibly crosslinked, cellulose ethers which can be brought into solution reliably and, firstly, can be processed in such a way as, and display an identical or similar dissolution behavior as, the known glyoxal-modified cellulose ethers but on the other hand are produced using neither glyoxal nor other low molecular weight, bifunctional or multifunctional compounds, e.g. malonic dialdehyde, succinaldehyde or glutaraldehyde, or liberate these during the crosslinking hydrolysis.

It is known that cellulose ethers can be converted into cellulose ethers containing aldehyde groups by oxidation of OH groups. The aldehyde groups of the cellulose ether chains can form hemiacetal bonds with the OH groups of neighboring cellulose ether chains (inter molecular crosslinking). Such aldehyde cellulose ethers can thus in principle be dispersed readily in water in a manner analogous to the above-described cellulose ethers which have been modified with glyoxal or other dialdehydes before going into solution without forming lumps after a certain dissolution delay. However, no low molecular weight compounds are added or liberated here.

However, the preparation of aldehyde cellulose ethers has been found to be quite problematical. Depending on the type of oxidant and on the reaction conditions, for example amount of oxidant used, reaction temperature, reaction time and pH, there are usually undesirable secondary reactions. Overoxidation to a carboxyl group and depolymerization and chain cleavage reactions can be prevented only with difficulty. The latter lead to a generally undesirable decrease in the molecular weight of the polymeric cellulose ethers, so that these develop a significantly decreased viscosity in solution. Irreversible crosslinking reactions which reduce the dissolution quality of the cellulose ethers in an unacceptable way through to complete insolubility sometimes also occur.

The oxidation of cellulose ethers with periodic acid or periodate represents a comparatively gentle method of preparing cellulose ethers containing aldehyde groups (see A. A. Sarymsakov et al., Uzbekskii Khimicheskii Zhurnal (1975), 19(5), 45-48). Here, vicinal OH groups located in the C2 and C3 position of the anhydroglucose unit are oxidized to aldehyde groups with cleavage of the C—C bond. Two aldehyde groups are always formed simultaneously here. The oxidized cellulose ethers are referred to as 2,3-dialdehyde cellulose ethers (DACE). In the cellulose ethers, the maximum number of aldehyde groups is limited by the degree of etherification and the distribution of the etherification, i.e. by the number of vicinal OH groups of the parent cellulose ethers. The oxidation of vicinal diols by means of periodic acid or periodate is known under the names glycol cleavage or Malaprade reaction in the literature. The oxidation of vicinal OH groups to aldehyde groups can in principle also be carried out using other, selectively acting oxidants, e.g. lead tetraacetate (Criegee glycol cleavage).

The use of periodic acid or periodate for the purposes of an industrial preparation of cellulose ethers having improved dispersibility, a delayed dissolution time and lump-free incorporability in water is described or mentioned in U.S. Pat. No. 3,376,285 and WO 2003/097700. However, in both cases, OH groups located directly on the anhydroglucose units of the cellulose ethers are oxidized to aldehyde groups.

In U.S. Pat. No. 3,376,285, a mixture of periodic acid, polypropylene glycol and water is sprayed onto a continuously mixed cellulose ether. The surface-treated cellulose ether is subsequently dried at 50° C. for 24 hours. The resulting dry product can readily be dispersed in water without agglomerates which are difficult to dissolve being formed. No information is given about the molecular weight or viscosity of the cellulose ether in aqueous solution. However, after-treatment with periodic acid at a temperature of 50° C. for 24 hours leads to a considerable, undesirable decrease in molecular weight. In addition, no information is given about the length of the dissolution delay achieved (i.e. incipient dissolution time). Furthermore, no information is given about the dissolution quality, the storage stability and the pH. In addition, the reaction product is not washed again, so that iodine compounds remain in the product. Additionally, the dissolution delay is a combined effect of reversible crosslinking via hemiacetal bonds and a dissolution delay caused by the addition of polypropylene glycol (better dispersibility resulting from mixing with a relatively non-volatile nonsolvent which is miscible with water).

In WO 2003/097700, cellulose ethers are, in the two examples presented, oxidized by means of a combination of N-chlorosuccinimide and 2,2,6,6-tetramethylpiperidin-1-oxyl (TEMPO) and subsequently dried at 105° C. Periodic acid or periodate is mentioned merely as an alternative oxidant. However, there is neither an example nor any indication of reaction conditions for this. No information is given about the molecular weight or the viscosity of the cellulose ether in aqueous solution. No information is given about dissolution quality, storage stability and pH. Furthermore, the reaction product is not washed again, so that the substances resulting from the added oxidants remain in the product.

U.S. Pat. No. 4,675,394 describes polysaccharides, including cellulose, which have aldehyde groups in a lateral ether group. Here, the aldehyde groups are not introduced into the polysaccharides by oxidation of OH groups but instead by means of alkaline etherification using bifunctional aldehyde compounds which are protected by means of acetal groups and subsequent acid-catalyzed hydrolysis of the acetal protective groups. The synthesis is comparatively complicated because of the removal of the acetal groups which is additionally required. In addition, no cellulose ethers containing aldehyde groups were able to be prepared by the synthetic route described even in experiments carried out a number of times with varying of the reaction parameters. Furthermore, the acidic conditions (pH 2.5-3.0)

required for removal of the protective groups would lead to the expectation that a usually undesirable decrease in molecular weight due to acidic ether cleavage of the β-glycosidic bond of the cellulose ether would not be able to be avoided. The protected aldehydes used are also comparatively expensive compounds which are commercially available only in relatively small amounts via specific custom syntheses. The route described in U.S. Pat. No. 4,675,394 is thus of no industrial importance for the preparation of cellulose ethers containing aldehyde groups, if these can be prepared at all in this way, since it is firstly much too expensive and secondly appears to be unsuitable for the preparation of high-viscosity cellulose ethers.

WO 2004/024775 describes temporary crosslinked cellulose ethers which have aldehyde groups in a lateral ester group. Here, the aldehyde groups are not introduced into the cellulose ethers by oxidation of OH groups but instead by means of acid-catalyzed esterification of cellulose ethers using low molecular weight aliphatic compounds which have at least one acid group and at least one aldehyde group. Glyoxylic acid is preferably used here. In the examples presented, only a comparatively small dissolution delay (=swelling delay) is obtained. A comparable swelling delay is obtained when cellulose ethers are moistened a little with water or aqueous organic solvents, mixed with a weak acid such as citric acid or acetic acid and subsequently dried at elevated temperature. It thus appears questionable whether the swelling delay described in WO 2004/024775 is attributable at all to the formation of an aldehyde ester. Owing to the acidic reaction conditions, it can be expected that the viscosity of the cellulose ethers will be significantly reduced and the storage stability of the acidic products is low. Furthermore, it can be expected that the products have a certain swelling delay only in the acidic pH range and the swelling delay is no longer present when the pH is increased into the neutral range. No information is given about the viscosity or the dissolution quality.

SUMMARY OF ADVANTAGEOUS EMBODIMENTS OF THE INVENTION

It was therefore an object of the present invention to provide reversibly crosslinked, water-soluble cellulose ethers which on dissolution in water do not liberate any low molecular weight aldehydes or dialdehydes associated with health concerns, e.g. glyoxal. A further object was to develop a process by means of which cellulose ethers can be reversibly crosslinked without use of low molecular weight dialdehydes such as glyoxal. The cellulose ethers should nevertheless have dissolution behavior which corresponds to the dissolution behavior of the cellulose ethers crosslinked by means of glyoxal. Furthermore, the reversible crosslinking should, if required, be able to be carried out in such a way that the cellulose ethers develop a comparably high viscosity in aqueous solution (avoidance of polymer degradation) as the parent unmodified cellulose ethers. In addition, the cellulose ethers should be able to be prepared inexpensively and on an industrial scale.

DETAILED DESCRIPTION OF ADVANTAGEOUS EMBODIMENTS OF THE INVENTION

This object is achieved by a reversibly crosslinked, water-soluble cellulose ether having at least two different ether components, wherein a) at least one of the ether components is an alkyl, hydroxyalkyl or carboxymethyl group and
b) at least one of the ether components is an alkyl group having an aldehyde function which can form hydrolyzable hemiacetals with free hydroxy groups of the cellulose ether, wherein the ether component b) is a 2-oxo-ethyl group and the degree of substitution DS (2-oxo-ethyl) is in the range of from 0.0001 to 0.1.

The ether component a) is preferably a methyl, ethyl, propyl, butyl, sec-butyl, isobutyl, 2-hydroxyethyl, hydroxypropyl and/or carboxymethyl group. The degree of substitution DS(alkyl) is advantageously in the range from 1.2 to 2.2, preferably in the range from 1.4 to 2.0. The degree of substitution MS(hydroxyalkyl) is advantageously in the range from 1.0 to 4.0, preferably in the range from 1.5 to 3.5. The degree of substitution DS(carboxymethyl) is advantageously in the range from 0.2 to 1.2, preferably in the range from 0.4 to 1.0. In the case of a plurality of ether components, the additional components can also have a significantly lower degree of substitution. It is critical that the total etherification is sufficiently high to ensure good solubility of the products in water. In principle, all customary ether combinations and degrees of substitution of commercially available water-soluble cellulose ethers are preferably possible. The ether component b) is a 2-oxoethyl group ($-CH_2-CH=O$). The degree of substitution $DS_{aldehyde}$ (2-oxoethyl) is advantageously in the range from about 0.0001 to 0.1, preferably in the range from about 0.001 to 0.05. This is preferably formed from a 2,3-dihydroxypropyl ether group by means of selective oxidation by reaction with preferably sodium periodate. Here, the $MS_{HPO}$ before oxidation should advantageously be somewhat higher than the desired $DS_{aldehyde}$. In principle, the $MS_{HPO}$ can also be set to a higher value, i.e. in the range of the degree of substitution MS(hydroxyalkyl) mentioned under a), but this is of rather minor interest because of the significantly greater raw materials cost for 2,3-epoxypropanol (glycidol) or 3-chloro-1,2-propanediol compared to, for example, ethylene oxide or propylene oxide in an industrial preparation of the reversibly crosslinked, water-soluble cellulose ethers claimed according to the invention.

As starting cellulose, it is possible to use all pulp materials which can be used for preparing cellulose. Preference is given to using pulp from conifers and broad-leaved trees and also cotton linters. The limiting viscosity number of the pulps is usually in the range from about 200 to 2200 ml/g.

The viscosities of the cellulose ethers of the invention which can be set in this way correspond to those which are known to a person skilled in the art from the literature concerning conventional cellulose ethers or are commercially available. When low-viscosity cellulose ethers are being prepared, the degradation processes known to those skilled in the art, e.g. molecular weight reduction by treatment with hydrogen peroxide, can be employed. The Brookfield viscosity of a 1.0% strength aqueous solution of the cellulose ethers can thus be in the range from 1 to about 15,000 mPa·s, preferably in the range from 100 to 10,000 mPa·s (after a sufficiently long dissolution time or breaking of the crosslinking by addition of alkali).

The cellulose ether of the invention is water-soluble. For the purposes of the present invention, this means that at least 10 g thereof are soluble in 1 liter of distilled water having a temperature of 20° C.

The cellulose ethers of the invention can be prepared by a process comprising the steps:

a) treatment of cellulose or cellulose ether with aqueous alkali metal hydroxide,
b) reaction of the alkalized cellulose with (i) ethylene oxide, propylene oxide and/or an alkyl halide and/or 2-chloroacetic acid or the sodium salt of 2-chloroacetic acid and (ii) with 2,3-epoxypropanol (glycidol) or 3-chloropropane-1,2-diol, or reaction of the alkalized cellulose ether with 2,3-epoxypropanol or 3-chloropropane-1,2-diol, forming 2,3-dihydroxypropyl ether groups in each case,
c) optionally washing of the product obtained in step b),
d) oxidative cleavage of the vicinal hydroxy groups in the 2,3-dihydroxypropyl ether groups, forming 2-oxoethyl ether groups,
e) washing of the cellulose ether obtained in step d), and
f) drying of the washed cellulose ether.

The cellulose ether used in step a) is preferably methyl cellulose, methyl carboxymethyl cellulose, methyl hydroxypropyl cellulose, hydroxyethyl cellulose, hydroxyethyl carboxymethyl cellulose, carboxymethyl cellulose or hydroxypropyl cellulose. It is thus possible to use either ionic or nonionic cellulose ethers.

Both the alkalization and the etherification of the celluloses or the cellulose ether are preferably carried out in a slurry process. The reaction of the alkalized cellulose with the ethylene oxide, propylene oxide and/or alkyl halide in step b) can be carried out simultaneously with the reaction with 2,3-epoxypropanol or 3-chloropropane-1,2-diol. As an alternative, the reaction with the 2,3-epoxypropanol or the 3-chloropropane-1,2-diol can be carried out immediately after the reaction with the ethylene oxide, propylene oxide and/or alkyl halide, preferably in the same reaction vessel.

The oxidative cleavage in step c) is preferably effected by treatment with periodate, periodic acid or lead tetraacetate. Suitable oxidants are in principle all reagents which oxidize the vicinal hydroxy groups very selectively to the aldehyde stage with cleavage of the C—C bond. The cleavage is preferably carried out at a temperature of from 10 to 60° C., in particular from 30 to 50° C., for a period of time from 30 minutes to 10 hours, in particular from 3 to 5 hours. The pH of the mixture during the oxidative cleavage is advantageously in the range from 4 to 7, preferably from 5 to 6. The oxidative cleavage forms formaldehyde which is removed during the subsequent washing of the cellulose ether. The oxidative cleavage is optionally carried out in such a way that only part of the 2,3-dihydroxypropyl groups is cleaved.

The washing and drying of the cellulose ethers is carried out in a routine manner. Here, the carbaldehyde groups react with hydroxy groups of the cellulose ethers with elimination of water and formation of hemiacetals. If hemiacetal formation occurs between two adjacent cellulose ether chains, branched and, in the case of a sufficiently large number of hemiacetal bridges, completely crosslinked cellulose ethers are initially obtained. Crosslinking thus occurs via the same chemical reaction as in the case of crosslinking with glyoxal. Unlike crosslinking with glyoxal, however, only one hemiacetal bond is formed per crosslinking point here, so that no low molecular weight compound is liberated on hydrolysis of the hemiacetal groups, i.e. the aldehyde group used for crosslinking is monofunctional and is firmly bound to in each case one of the participating cellulose ether chains by means of a covalent bond which is hydrolysis-resistant in water or water-containing solvents.

The particular advantage of the present invention compared to crosslinking with low molecular weight bifunctional or multifunctional compounds is that no further low molecular weight substance is eliminated from the cellulose ethers which have been crosslinked according to the invention when the crosslinked cellulose ethers are dissolved in water and that problems connected with toxicological concerns about the elimination products therefore can no longer occur.

Analytical Methods:

Determination of the Limiting Viscosity Number (LVN):

The limiting viscosity numbers cited for characterizing the pulps used were determined on copper-ethylene diamine solution (Cuen solution) at 25.0° C. using a VISCOMAT® II from Lagge in accordance with the method ISO 5352: 2010 which is known to those skilled in the art.

Determination of the Dry Matter Content (DMC):

The dry matter contents cited for characterizing the pulps used were determined at a drying temperature of 105° C. on an infrared rapid-drier Moisture Analyzer MA 30 from Sartorius. Here, about 3 g of pulp were dried to constant weight.

Determination of the Viscosity (visc):

The viscosity values cited for characterizing the cellulose ethers prepared were determined on an aqueous solution after a dissolution time of two days at 20.0° C. on a rotational viscometer from Brookfield (model RVDV-III) using deionized water and a rotational speed of 20 rpm. The concentration of the cellulose ether solution of 1.0 or 1.9% by weight is based on the absolutely dry cellulose ether (adr). The number of the spindle used is shown in parentheses after the viscosity value.

Determination of the Degrees of Etherification or the Molar Degrees of Substitution ($MS_{EO}$ and $MS_{HPO}$):

The molar degrees of substitution cited for characterizing the cellulose ethers prepared were determined by means of Zeisel digestion with hydroiodic acid and GC analysis. For this purpose, the cellulose ether was treated with hydroiodic acid at about 143-150° C. in the presence of adipic acid, toluene (internal standard) and xylene (solvent) in a closed vessel, with the alkyl iodide formed by elimination of the ether groups dissolving in the xylene phase. To determine the content, an aliquot of the xylene phase was injected into a gas chromatograph (e.g. TRACE™ GC ultra, Thermo Electron Corporation). The components were separated in the separation column of the gas chromatograph (e.g. 30 m DB-624×0.53 mm I. D.×3.0 μm film or comparable column; preliminary column, e.g. 2.5 m deactivated capillary tube, 0.53 mm I. D.). The peak areas were evaluated by means of a laboratory data system. The content determination was carried out by the method of internal standards (ISTD), by means of multipoint calibration. The $MS_{EO}$ is the molar degree of substitution resulting from the etherification using ethylene oxide. The $MS_{HPO}$ is the molar degree of substitution resulting from the etherification with 2,3-epoxypropanol (glycidol or hydroxypropylene oxide). Here, a blank value of 0.005 (examples 1-8 and comparative example 1) or 0.003 (examples 9-14 and comparative example 2) was taken into account, i.e. subtracted from the $MS_{HPO}$ value calculated from the $OC_3H_6$ content determined by means of GC. In addition, the determination was carried out on the end product and thus after treatment with periodate. Assuming selective cleavage of the 2,3-dihydroxypropyl ether groups and 100 percent reaction (periodate no longer detectable), the $MS_{HPO}$ value before treatment with periodate can be calculated therefrom by adding the amount of periodate used per anhydroglucose unit (mol of periodate per mol of AHG).

Calculation of the Alkyl Groups Having an Aldehyde Function ($DS_{aldehyde}$) Produced by Means of Glycol Cleavage:

The $DS_{aldehyde}$ is the average degree of substitution by 2-oxoethyl groups resulting from reaction of the 2,3-dihydroxypropyl ether groups with periodate. Assuming selective cleavage of the 2,3-dihydroxypropyl ether groups and 100 percent reaction (periodate no longer detectable), the $DS_{aldehyde}$ is identical to the amount of periodate used per anhydroglucose unit (MR PI; mol of periodate per mol of AHG). Here, the $MS_{HPO}$ before treatment with periodate has to be sufficiently high. This is the case only when the DHPHEC has been washed sufficiently before treatment with periodate, since otherwise ethylene glycol (by-product of the etherification with ethylene oxide) likewise reacts with the periodate. Without prior washing, the amount of periodate required for setting a desired dissolution delay is therefore greater than in the case of previously washed DHPHEC.

Determination of the pH Value (pH):

The pH values cited for characterizing the cellulose ethers prepared were determined on 1.0% strength by weight solutions (adr) in deionized water at 25° C. by means of a pH meter having a combination pH electrode.

Determination of the Centrifuge Residue (CR):

The centrifuge residues cited for assessing the dissolution quality of the cellulose ethers prepared were determined by gravimetric determination of the water-insoluble material (based on dry matter of the cellulose ethers). For this purpose, the cellulose ethers were dissolved in deionized water and the insoluble suspended particles present in the solution were centrifuged down in a centrifuge. The supernatent liquid was drawn off and the soluble cellulose ether remaining in the precipitate was washed out by means of a plurality of washing and centrifugation operations. The insoluble residue which remained was dried and weighed. Both water-insoluble fibers and swelled bodies are determined by the method.

Determination of the Incipient Dissolution Time (IDT) and Final Dissolution Time (FDT):

The incipient dissolution times and final dissolution times cited for the assessment of the dissolution delay of the cellulose ethers prepared were determined in water by means of a continuous viscosity measurement and recording via an xt plotter during the dissolution process in a Brabender VISCOGRAPH® at 20.0° C. using mains water, a weight of cellulose ether of 1.5% by weight and a stirring speed of 75 rpm. The swelling time is the time in minutes between introduction of the product and achievement of a viscosity of 100 Brabender units (BE)=65 mPa·s. The final dissolution time is the time in minutes after which no further viscosity increase occurs.

Molar Ratios (MR):

The molar ratios shown in the tables are always based on the number of moles of anhydroglucose units (AHG) of the pulp used. MR EO=mole of ethylene oxide per mole of AHG; MR HPO=mole of 2,3-epoxypropanol (glycidol or hydroxypropylene oxide) per mole of AHG; MR PI=mole of sodium metaperiodate per mole of AHG.

With the aid of the examples, it will be shown how the cellulose ethers according to the invention which have been modified so as to exhibit delayed dissolution can be prepared by coetherification of conventional cellulose ethers and mixed ethers with a further ether component having one or optionally more vicinal hydroxy groups and subsequent oxidative cleavage of the C—C bond bearing the hydroxy groups without a particular outlay. The degree of dissolution delay can be easy set in a targeted way via the degree of coetherification and/or the degree of oxidation. Owing to the high selectivity and the mild reaction conditions required in the oxidation, modified cellulose ethers which still have a high viscosity can be prepared. However, it is also possible to reduce the viscosity of the modified cellulose ether in a targeted manner by means of the oxidation reaction. The coetherification of the cellulose ether can here be carried out by the conventional methods known to those skilled in the art. In particular, the coetherification can be carried out either in one or two stages or else subsequently. Furthermore, the etherification can be carried out both without and with partial neutralization during the etherification, with the latter usually being employed in the preparation of cellulose ethers having increased biostability. The oxidation of the vicinal hydroxy groups of the ether component can be carried out before, during or after washing of the cellulose ether. The examples describe, by way of example, the preparation of delayed-dissolution modified hydroxyethyl cellulose, which has been carried out by etherification in the slurry process using tert.-butanol or isopropanol as suspension medium. 2,3-epoxypropanol was always used as coetherification component and sodium metaperiodate was always used as oxidant.

Percentages in the following examples are percentages by weight, unless indicated otherwise or apparent from the context.

EXAMPLE 1

83.2 g (0.50 mol) of milled pulp (DMC=97.4%; LVN=1 350 ml/g) were admixed with 537.6 g of 95% strength tert.-butanol and 73.0 g of 100% strength isopropanol and suspended with stirring in a 2 l pressure reactor. The suspension was freed of oxygen by means of a plurality of vacuum/nitrogen cycles (evacuation to 0.1 bar three times with introduction of nitrogen to 2.1 bar in between). 83.9 g of 31.0% strength sodium hydroxide solution (0.65 mol) were then introduced via a dropping funnel which had also been made inert, the suspension was once again freed of oxygen in a manner analogous to before and stirred at 25° C. for 20 minutes. After addition of 66.1 g (1.50 mol) of ethylene oxide via a dead-space-free connected pressurized gas bottle, the suspension was heated to 85° C. over a period of 120 minutes and subsequently partially neutralized with 60.9 g of 59.0% strength nitric acid (0.57 mol) via a dropping funnel which had also been made inert, 18.5 g (0.25 mol) of 2,3-epoxypropanol were added and the mixture was stirred at 85° C. for 120 minutes. After cooling to 30° C., the mixture was neutralized with about 4.8 g (0.08 mol) of acetic acid and the product was washed free of salts by multiple treatments with 80% strength acetone. The moist filter cake which had been filtered off with suction via a glass frit was returned to the reactor and suspended in 1000 g of 85% strength acetone. A pH of 5.0 was set by addition of acetic acid. A solution of 0.86 g (0.004 mol) of sodium metaperiodate in 50 g of water was subsequently added and the mixture was stirred at 50° C. for 3 hours. After cooling to 30° C., the product was washed free of salts by treatment with 80% strength acetone and dewatered by treatment with 100% strength acetone and filtered off with suction on a glass frit. The filter cake was broken up, dried overnight at 70° C., moisture-conditioned relative to the atmosphere of the room, milled and sieved to less than 1000 µm. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated here (negative test for glyoxal). The dissolution delay could be spontaneously ended by addition of alkali, as in the case of glyoxal-crosslinked cellulose ethers. The following product data were determined: $MS_{EO}$=2.18; $MS_{HPO}$=0.347; visc 1.0%=2 495 mPa·s (sp. 3); visc 1.9%=20 300 mPa·s (sp. 6); pH 1.0%=5.6; CR=0.1%; IDT=27 min; FDT=70 min.

COMPARATIVE EXAMPLE 1

83.2 g (0.50 mol) of milled pulp (DMC=97.4%; LVN=1 315 ml/g) were admixed with 537.6 g of 95% strength tert.-butanol and 73.0 g of 100% strength isopropanol and suspended with stirring in a 2 l pressure reactor. The suspension was freed of oxygen by means of a plurality of vacuum/nitrogen cycles (evacuation to 0.1 bar three times with introduction of nitrogen to 2.1 bar in between). 83.9 g of 31.0% strength sodium hydroxide solution (0.65 mol) were then introduced via a dropping funnel which had also been made inert, the suspension was once again freed of oxygen in a manner analogous to before and stirred at 25° C. for 20 minutes. After addition of 66.1 g (1.50 mol) of ethylene oxide via a dead-space-free connected pressurized gas bottle, the suspension was heated to 85° C. over a period of 120 minutes and subsequently partially neutralized with 60.9 g of 59.0% strength nitric acid (0.57 mol) via a dropping funnel which had also been made inert. 18.5 g (0.25 mol) of 2,3-epoxypropanol were added and the mixture was stirred at 85° C. for 120 minutes. After cooling to 30° C., the mixture was neutralized with about 4.8 g (0.08 mol) of acetic acid and the product was washed free of salts by multiple treatments with 80% strength acetone and dewatered by treatment with 100% strength acetone and filtered off on a glass frit. The filter cake was broken up, dried overnight at 70° C., moisture-conditioned relative to the air of the room, milled and sieved to less than 1 000 μm. The pulverulent DHPHEC obtained displayed no dissolution delay and formed lumps on stirring into water; although the solution immediately became viscous, the lumps went completely into solution only after some days. The following product data were determined: $MS_{EO}$=2.22; $MS_{HPO}$=0.368; visc 1.0%=2 730 mPa·s (sp. 4); visc 1.9%=19 550 mPa·s (sp. 6); pH 1.0%=6.8; CR=0.1%; IDT and FDT not determined since the product could not be stirred in without lumps.

EXAMPLE 2

The experiment was carried out in a manner analogous to Example 1, but only 0.43 g (0.002 mol) of sodium metaperiodate instead of 0.86 g (0.004 mol) were added. The pulverulent, modified DHPHEC obtained could be stirred into water without formation of lumps, giving firstly a fluid turbid dispersion which when completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.19; $MS_{HPO}$=0.380; visc 1.0%=2 970 mPa·s (sp. 4); visc 1.9%=22 100 mPa·s (sp. 6); pH 1.0%=5.9; CR=0.4%; IDT=13 min; FDT=42 min.

EXAMPLE 3

The experiment was carried out in a manner analogous to Example 1, but only 0.11 g (0.0005 mol) of sodium metaperiodate instead of 0.86 g (0.004 mol) were added. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.23; $MS_{HPO}$=0.378; visc 1.0%=2 770 mPa·s (sp. 4); visc 1.9%=19 200 mPa·s (sp. 6); pH 1.0%=5.8; CR=0.6%; IDT=7 min; FDT=33 min.

EXAMPLE 4

The experiment was carried out in a manner analogous to Example 2, but only 1.85 g (0.025 mol) of 2,3-epoxypropanol dissolved in 20 g of 95% strength tert.-butanol were added instead of 18.5 g (0.25 mol). The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.16; $MS_{HPO}$=0.031; visc 1.0%=1 875 mPa·s (sp. 3); visc 1.9%=16 060 mPa·s (sp. 5); pH 1.0%=6.7; CR=0.7%; IDT=9 min; FDT=29 min.

EXAMPLE 5

The experiment was carried out in a manner analogous to Example 2, but only 0.37 g (0.005 mol) of 2,3-epoxypropanol dissolved in 20 g of 95% strength tert.-butanol were added instead of 18.5 g (0.25 mol). The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.27; $MS_{HPO}$=0.004; visc 1.0%=1 185 mPa·s (sp. 3); visc 1.9%=11 500 mPa·s (sp. 5); pH 1.0%=6.5; CR=0.6%; IDT=8 min; FDT=21 min.

EXAMPLE 6

The experiment was carried out in a manner analogous to Example 4, but 79.3 g (1.80 mol) instead of 66.1 g (1.50 mol) of ethylene oxide and 1.28 g (0.006 mol) instead of 0.43 g (0.002 mol) of sodium metaperiodate were added. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated here (negative test for glyoxal). The dissolution delay could be spontaneously ended by addition of alkali, as in the case of glyoxal-crosslinked cellulose ethers. The following product data were determined: $MS_{EO}$=2.64; $MS_{HPO}$=0.024; visc 1.0%=1 500 mPa·s (sp. 3); visc 1.9%=16 200 mPa·s (sp. 6); pH 1.0%=6.0; CR=0.6%; IDT=13 min; FDT=51 min.

EXAMPLE 7

The experiment was carried out in a manner analogous to Example 6, but the oxidation by means of sodium metaperiodate was carried out at 40° C. instead of 50° C. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.64; $MS_{HPO}$=0.027; visc 1.0%=2 745 mPa·s (sp. 3); visc 1.9%=22 100 mPa·s (sp. 6); pH 1.0%=5.6; CR=0.3%; IDT=15 min; FDT=58 min.

EXAMPLE 8

83.2 g (0.50 mol) of milled pulp (DMC=97.4%; LVN=1 350 ml/g) were admixed with 537.6 g of 95% strength tert.-butanol and 73.0 g of 100% strength isopropanol and suspended with stirring in a 2 l pressure reactor. The suspension was freed of oxygen by means of a plurality of vacuum/nitrogen cycles (evacuation to 0.1 bar three times with introduction of nitrogen to 2.1 bar in between). 83.9 g of 31.0% strength sodium hydroxide solution (0.65 mol) were then introduced via a dropping funnel which had also been made inert, the suspension was once again freed of oxygen in a manner analogous to before and stirred at 25° C. for 20 minutes. After addition of 66.1 g (1.50 mol) of ethylene oxide via a dead-space-free connected pressurized gas bottle, the suspension was heated to 85° C. over a period of 120 minutes and subsequently partially neutralized with 60.9 g of 59.0% strength nitric acid (0.57 mol) via a dropping funnel which had also been made inert. 18.5 g (0.25 mol) of 2,3-epoxypropanol were added and the mixture was stirred at 85° C. for 120 minutes. After cooling to 30° C., a pH of 5.0 was set by addition of acetic acid. A solution of 1.28 g (0.006 mol) of sodium metaperiodate in 25 g of water was subsequently added and the mixture was stirred at 50° C. for 3 hours. After cooling to 30° C., the product was washed free of salts by repeated treatment with 80% strength acetone and dewatered by treatment with 100% strength acetone and filtered off with suction on a glass frit. The filter cake was broken up, dried overnight at 70° C., moisture-conditioned relative to the air of the room, milled and sieved to less than 1000 μm. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.22; $MS_{HPO}$=0.036; visc 1.0%=3 510 mPa·s (sp. 4); visc 1.9%=26 950 mPa·s (sp. 6); pH 1.0%=6.3; CR=0.7%; IDT=6 min; FDT=36 min.

EXAMPLE 9

83.5 g (0.50 mol) of milled pulp (DMC=97.1%; LVN=1.569 ml/g) were admixed with 584.3 g of 100% strength isopropanol and suspended with stirring in a 2 l pressure reactor. The suspension was freed of oxygen by means of a plurality of vacuum/nitrogen cycles (evacuation to 0.1 bar three times with introduction of nitrogen to 2.1 bar in between). 157.1 g of 16.5% strength sodium hydroxide solution (0.65 mol) were then introduced via a dropping funnel which had also been made inert, the suspension was once again freed of oxygen in a manner analogous to before and stirred at 25° C. for 15 minutes. After addition of 110.1 g (2.50 mol) of ethylene oxide via a dead-space-free connected pressurized gas bottle, the suspension was heated to 40° C. over a period of 30 minutes, stirred at 40° C. for 60 minutes and heated to 85° C. over a period of 60 minutes. 2.6 g (0.035 mol) of 2,3-epoxypropanol dissolved in 20 g of 100% strength isopropanol were added and the mixture was stirred at 85° C. for 60 minutes. After cooling to 30° C., the mixture was neutralized with 59.6 g of 37.0% strength hydrochloric acid (0.605 mol) and 2.7 g of acetic acid (0.046 mol) and the product was washed free of salts by multiple treatments with 80% strength isopropanol. The moist filter cake which had been filtered off with suction via a glass frit was returned to the reactor and suspended in 1000 g of 85% strength isopropanol. A pH of 5.0 was set by addition of acetic acid. A solution of 2.57 g (0.012 mol) of sodium metaperiodate in 50 g of water was subsequently added and the mixture was stirred at 30° C. for 3 hours. The product was subsequently washed free of salts by treatment with 80% strength isopropanol and dewatered by treatment with 100% strength acetone and filtered off with suction on a glass frit. The filter cake was broken up, dried overnight at 70° C., moisture-conditioned relative to the air of the room, milled and sieved to less than 1000 μm. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.55; $MS_{HPO}$=0.007; visc 1.0%=4 430 mPa·s (sp. 4); visc 1.9%=33 050 mPa·s (sp. 6); pH 1.0%=5.8; CR=0.4%; IDT=37 min; FDT=74 min.

COMPARATIVE EXAMPLE 2

83.5 g (0.50 mol) of milled pulp (DMC=97.1%; LVN=1 569 ml/g) were admixed with 584.3 g of 100% strength isopropanol and suspended with stirring in a 2 l pressure reactor. The suspension was freed of oxygen by means of a plurality of vacuum/nitrogen cycles (evacuation to 0.1 bar three times with introduction of nitrogen to 2.1 bar in between). 157.1 g of 16.5% strength sodium hydroxide solution (0.65 mol) were then introduced via a dropping funnel which had also been made inert, the suspension was once again freed of oxygen in a manner analogous to before and stirred at 25° C. for 15 minutes. After addition of 110.1 g (2.50 mol) of ethylene oxide via a dead-space-free connected pressurized gas bottle, the suspension was heated to 40° C. over a period of 30 minutes, stirred at 40° C. for 60 minutes and heated to 85° C. over a period of 60 minutes. 2.6 g (0.035 mol) of 2,3-epoxypropanol dissolved in 20 g of 100% strength isopropanol were added and the mixture was stirred at 85° C. for 60 minutes. After cooling to 30° C., the mixture was neutralized with 59.6 g of 37.0% strength hydrochloric acid (0.605 mol) and 2.7 g of acetic acid (0.046 mol). The product was washed free of salts by multiple treatments with 80% strength isopropanol dewatered by treatment with 100% strength acetone and filtered off by suction on a glass frit. The filter cake was broken up, dried overnight at 70° C., moisture-conditioned relative to the air of the room, milled and sieved to less than 1 000 µm. The pulverulent DHPHEC obtained displayed no dissolution delay and formed lumps on stirring into water; although the solution immediately became viscous, the lumps went completely into solution only after some days. The following product data were determined: $MS_{EO}$=2.68; $MS_{HPO}$=0.030; visc 1.0%=4 370 mPa·s (sp. 4); visc 1.9%=29 000 mPa·s (sp. 6); pH 1.0%=7.0; CR=0.6%; IDT and FDT not determined since the product could not be stirred in without lumps.

EXAMPLE 10

The experiment was carried out in a manner analogous to Example 9, but only 0.86 g (0.004 mol) of sodium metaperiodate instead of 2.57 g (0.012 mol) were added. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.61; $MS_{HPO}$=0.019; visc 1.0%=4 580 mPa·s (sp. 4); visc 1.9%=30 950 mPa·s (sp. 6); pH 1.0%=5.9; CR=0.1%; IDT=9 min; FDT=27 min.

EXAMPLE 11

The experiment was carried out in a manner analogous to Example 9, but 5.6 g (0.75 mol) instead of 2.6 g (0.035 mol) of 2,3-epoxypropanol and 0.86 g (0.004 mol) instead of 2.57 g (0.012 mol) of sodium metaperiodate were added. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.63; $MS_{HPO}$=0.052; visc 1.0%=4 710 mPa·s (sp. 4): visc 1.9%=30 500 mPa·s (sp. 6); pH 1.0%=5.8; CR=0.1%; IDT=16 min; FDT=43 min.

EXAMPLE 12

The experiment was carried out in a manner analogous to Example 9, but 1.9 g (0.025 mol) instead of 2.6 g (0.035 mol) of 2,3-epoxypropanol and 0.86 g (0.004 mol) instead of 2.57 g (0.012 mol) of sodium metaperiodate were added. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.57; $MS_{HPO}$=0.011; visc 1.0%=4 720 mPa·s (sp. 4); visc 1.9%=30 900 mPa·s (sp. 6); pH 1.0%=5.8; CR=0.1%; IDT=19 min; FDT=42 min.

EXAMPLE 13

83.5 g (0.50 mol) of milled pulp (DMC=97.1%; LVN=1 569 ml/g) were admixed with 584.3 g of 100% strength isopropanol and suspended with stirring in a 2 l pressure reactor. The suspension was freed of oxygen by means of a plurality of vacuum/nitrogen cycles (evacuation to 0.1 bar three times with introduction of nitrogen to 2.1 bar in between). 157.1 g of 16.5% strength sodium hydroxide solution (0.65 mol) were then introduced via a dropping funnel which had also been made inert, the suspension was once again freed of oxygen in a manner analogous to before and stirred at 25° C. for 15 minutes. After addition of 99.1 g (2.25 mol) of ethylene oxide via a dead-space-free connected pressurized gas bottle, the suspension was heated to 40° C. over a period of 30 minutes, stirred at 40° C. for 60 minutes and heated to 85° C. over a period of 60 minutes. 2.6 g (0.035 mol) of 2,3-epoxypropanol dissolved in 20 g of 100% strength isopropanol were added and the mixture was stirred at 85° C. for 60 minutes. After cooling to 30° C., the mixture was neutralized with 59.6 g of 37.0% strength hydrochloric acid (0.605 mol) and 2.7 g of acetic acid (0.046 mol) and a pH of 5.0 was set by addition of acetic acid. A solution of 2.14 g (0.010 mol) of sodium metaperiodate in 50 g of water was subsequently added and the mixture was stirred at 40° C. for 3 hours. The product was then washed free of salts by multiple treatments with 80% strength isopropanol and dewatered by treatment with 100% strength acetone and filtered off with suction on a glass frit. The filler cake was broken up, dried overnight at 70° C., moisture-conditioned relative to the air of the room, milled and sieved to less than 1000 µm. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.41: $MS_{HPO}$=0.027; visc 1.0%=4 800 mPa·s (sp. 4); visc 1.9%=30 750 mPa·s (sp. 6); pH 1.0%=6.5; CR=0.6%; IDT=9 min; FDT=18 min.

EXAMPLE 14

The experiment was carried out in a manner analogous to Example 13, but only 1.07 g (0.005 mol) of sodium metaperiodate instead of 2.14 g (0.010 mol) were added. The pulverulent, modified DHPHEC obtained could be stirred into water without formation of lumps, giving firstly a fluid turbid dispersion which went completely homogeneously into solution with an increase in viscosity only after a significant dissolution delay until finally a transparent, virtually colorless, viscous solution was obtained. The dissolution behavior corresponded to that of glyoxal-crosslinked cellulose ethers, but without glyoxal being liberated (negative test for glyoxal). The dissolution delay could be spontaneously ended by addition of alkali, as in the case of glyoxal-crosslinked cellulose ethers. The following product data were determined: $MS_{EO}$=2.25; $MS_{HPO}$=0.027; visc 1.0%=5 090 mPa·s (sp. 4); visc 1.9%=32 950 mPa·s (sp. 6); pH 1.0%=6.4; CR=0.2%; IDT=5 min; FDT=12 min.

the degree of substitution DS (2-oxo-ethyl) moiety and its hydrolysable hemiacetals is in the range of from 0.0001 to 0.1, wherein the 2-oxo-ethyl moieties may or may not be present as hydrolysable hemiacetals, and no low molecular weight aldehydes are liberated upon dissolution of the cellulose ether in water.

2. The cellulose ether as claimed in claim 1, wherein the ether component a) is a methyl, ethyl, propyl, butyl, sec-butyl, isobutyl, 2-hydroxyethyl, hydroxypropyl and/or carboxymethyl group.

3. The cellulose ether as claimed in claim 1, wherein the degree of substitution DS(2-oxoethyl) is in the range from 0.001 to 0.05.

4. The cellulose ether as claimed in claim 1, wherein the degree of substitution DS(alkyl) is in the range from 1.2 to 2.2.

5. The cellulose ether as claimed in claim 1, wherein the degree of substitution MS(hydroxyalkyl) is in the range from 0.8 to 3.0 and the degree of substitution DS(carboxymethyl) is in the range from 0.1 to 1.0.

6. The cellulose ether as claimed in claim 5, wherein the degree of substitution MS(hydroxyalkyl) is in the range from 1.0 to 2.4 and the degree of substitution DS(carboxymethyl) is in the range from 0.2 to 0.7.

7. The cellulose ether as claimed in claim 1, wherein the degree of substitution DS(carboxymethyl) is in the range from 0.3 to 1.2.

TABLE 1

Product data for DHPHEC after-treated with sodium metaperiodate (tert.-butanol process).

| | LVN [ml/g] | MR EO [mol/mol] | $MS_{EO}$ | MR HPO [mol/mol] | $MS_{HPO}$ (after PI) | MR PI [mol/mol] | Periodate oxidation | Visc 1.0% [mPa s] | Visc 1.9% [mPa · s] | pH | CR [%] | IDT/FDT [min] |
|---|---|---|---|---|---|---|---|---|---|---|---|---|
| Example 1 | 1 315 | 3.00 | 2.18 | 0.50 | 0.347 | 0.008 | 3 h/50° C. | 2 495 | 20 300 | 5.6 | 0.1 | 27/70 |
| Example 2 | 1 315 | 3.00 | 2.19 | 0.50 | 0.380 | 0.004 | 3 h/50° C. | 2 970 | 22 100 | 5.9 | 0.3 | 13/42 |
| Example 3 | 1 315 | 3.00 | 2.23 | 0.50 | 0.378 | 0.001 | 3 h/50° C. | 2 770 | 19 200 | 5.8 | 0.6 | 7/33 |
| Example 4 | 1 315 | 3.00 | 2.16 | 0.05 | 0.031 | 0.004 | 3 h/50° C. | 1 875 | 16 060 | 6.7 | 0.7 | 9/29 |
| Example 5 | 1 315 | 3.00 | 2.27 | 0.01 | 0.004 | 0.004 | 3 h/50° C. | 1 185 | 11 500 | 6.5 | 0.6 | 8/21 |
| Example 6 | 1 315 | 3.60 | 2.64 | 0.05 | 0.024 | 0.012 | 3 h/50° C. | 1 500 | 16 200 | 6.0 | 0.6 | 13/51 |
| Example 7 | 1 315 | 3.60 | 2.64 | 0.05 | 0.027 | 0.012 | 3 h/40° C. | 2 745 | 22 100 | 5.6 | 0.3 | 15/58 |
| Example 8 | 1 315 | 3.00 | 2.22 | 0.05 | 0.036 | 0.012 | 3 h/50° C. | 3 510 | 26 950 | 6.3 | 0.7 | 6/35 |
| Comparative example 1 | 1 315 | 3.00 | 2.22 | 0.50 | 0.368 | — | — | 2 730 | 19 550 | 6.8 | 0.1 | n.m. (formed lumps) |

TABLE 2

Product data for DHPHEC after-treated with sodium metaperiodate (isopropanol process).

| | LVN [ml/g] | MR EO [mol/mol] | $MS_{EO}$ | MR HPO [mol/mol] | $MS_{HPO}$ (after PI) | MR PI [mol/mol] | Periodate oxidation | Visc 1.0% [mPa · s] | Visc 1.9% [mPa · s] | pH | CR [%] | IDT/FDT [min] |
|---|---|---|---|---|---|---|---|---|---|---|---|---|
| Example 9 | 1 569 | 5.00 | 2.55 | 0.07 | 0.007 | 0.024 | 3 h/30° C. | 4 430 | 33 050 | 5.8 | 0.4 | 37/74 |
| Example 10 | 1 569 | 5.00 | 2.61 | 0.07 | 0.019 | 0.008 | 3 h/30° C. | 4 580 | 30 950 | 5.9 | 0.1 | 9/27 |
| Example 11 | 1 569 | 5.00 | 2.63 | 0.15 | 0.052 | 0.008 | 3 h/30° C. | 4 710 | 30 500 | 5.8 | 0.1 | 16/43 |
| Example 12 | 1 569 | 5.00 | 2.57 | 0.05 | 0.011 | 0.008 | 3 h/30° C. | 4 720 | 30 900 | 5.8 | 0.0 | 19/42 |
| Example 13 | 1 569 | 4.50 | 2.41 | 0.07 | 0.027 | 0.020 | 3 h/40° C. | 4 800 | 30 750 | 6.5 | 0.6 | 9/18 |
| Example 14 | 1 569 | 4.50 | 2.41 | 0.07 | 0.027 | 0.010 | 3 h/40° C. | 5 090 | 32 950 | 6.4 | 0.2 | 5/12 |
| Comparative example 2 | 1 569 | 5.00 | 2.68 | 0.07 | 0.030 | — | — | 4 370 | 29 000 | 7.0 | 0.6 | n.m. (formed lumps) |

That which is claimed:

1. A reversibly crosslinked, water-soluble dried cellulose ether comprising hydrolysable hemiacetals, said cellulose ether having at least two different ether components,
   a) a first ether component that is at least one of an alkyl, hydroxyalkyl or carboxymethyl group and
   b) a second ether component consisting of 2-oxo-ethyl moieties and optional 2,3-dihydroxypropyl moieties, 8. The cellulose ether as claimed in claim 1, wherein, after breaking the cellulose ether crosslinking by adding alkali, the cellulose ether has a viscosity in 1% strength aqueous solution in the range from 1 to 15 000 mPa·s.

9. The cellulose ether as claimed in claim 8, wherein, after breaking the cellulose ether crosslinking by adding alkali, the cellulose ether has a viscosity in 1% strength aqueous solution in the range from 100 to 10 000 mPa·s.

10. The cellulose ether as claimed in claim 1, wherein the cellulose ether is periodate-oxidized.

11. The cellulose ether as claimed in claim 1, wherein the cellulose ether is not ethyl cellulose.

12. The cellulose ether as claimed in claim 1, wherein the incipient dissolution time ranges from 7 to 27 minutes.

13. The cellulose ether as claimed in claim 1, wherein the cellulose ether is periodate-oxidized cellulose without polymer degradation.

14. The cellulose ether as claimed in claim 1, wherein the cellulose ether further comprises OH groups.

15. The cellulose ether as claimed in claim 1, wherein the aldehyde function of said 2-oxo-ethyl moieties is essentially present as hydrolysable hemiacetal bonded with free OH groups of the cellulose ether.

16. The cellulose ether as claimed in claim 1, wherein said cellulose ether exhibits a delayed dissolution whose dissolution can be accelerated by increasing the pH.

17. A reversibly crosslinked, water-soluble dried cellulose ether comprising hydrolysable hemiacetals, said cellulose ether having at least two different ether components,
   a) a first ether component that is at least one of an alkyl, hydroxyalkyl or carboxymethyl group and
   b) a second ether component consisting of 2-oxo-ethyl moieties and optional 2,3-dihydroxypropyl moieties, the dried aldehyde function of said 2-oxo-ethyl moieties consisting of hydrolysable hemiacetal bonded with free OH groups of the cellulose ether, the degree of substitution DS (2-oxo-ethyl) moiety is in the range of from 0.0001 to 0.1,
   and no low molecular weight aldehydes are liberated upon dissolution of the cellulose ether in water,
   wherein the degree of substitution DS(alkyl) is in the range from 1.2 to 2.2 and the degree of substitution MS(hydroxyalkyl) is in the range from 0.02 to 1.0.

18. A reversibly crosslinked, water-soluble dried cellulose ether comprising hydrolysable hemiacetals, said cellulose ether having at least two different ether components,
   a) a first ether component that is at least one of an alkyl, hydroxyalkyl or carboxymethyl group and
   b) a second ether component consisting of 2-oxo-ethyl moieties and optional 2,3-dihydroxypropyl moieties, the degree of substitution DS (2-oxo-ethyl) moiety is in the range of from 0.0001 to 0.1, the 2-oxo-ethyl moieties may or may not be present as hydrolysable hemiacetals, and no low molecular weight aldehydes are liberated upon dissolution of the cellulose ether in water
   wherein (i) the degree of substitution MS(hydroxyalkyl) is in the range from 1.0 to 4.0; (ii) the degree of substitution MS(hydroxyalkyl) is in the range from 0.8 to 3.0 and the degree of substitution DS(carboxymethyl) is in the range from 0.1 to 1.0; (iii) the degree of substitution MS(hydroxyalkyl) is in the range from 1.0 to 2.4 and the degree of substitution DS(carboxymethyl) is in the range from 0.2 to 0.7 or (iv) the degree of substitution DS(carboxymethyl) is in the range from 0.3 to 1.2.

19. A reversibly crosslinked, water-soluble dried cellulose ether having two different ether components consisting of
   a) a first dried ether component selected from a methyl, ethyl, propyl, butyl, sec-butyl, isobutyl, 2-hydroxyethyl, hydroxypropyl and/or carboxymethyl group and
   b) a second dried ether component consisting of hydrolysable hemiacetal bonds and optional 2,3-dihydroxypropyl groups,
   no low molecular weight aldehydes are liberated upon dissolution of the cellulose ether in water and
   the incipient dissolution time ranges from 7 to 27 minutes, unless accelerated by alkali.

20. A reversibly crosslinked, water-soluble dried cellulose ether comprising hydrolysable hemiacetals, said cellulose ether having at least two different ether components,
   a) a first ether component that is at least one of an alkyl, hydroxyalkyl or carboxymethyl group and
   b) a second ether component consisting of 2-oxo-ethyl moieties and optional 2,3-dihydroxypropyl moieties, the degree of substitution DS (2-oxo-ethyl) moiety is in the range of from 0.0001 to 0.1, with the dried 2-oxo-ethyl moieties consisting of hydrolysable hemiacetals, no low molecular weight aldehydes are liberated upon dissolution of the cellulose ether in water, and the final dissolution time ranges from 21 to 70 minutes unless accelerated by alkali.

21. A process for preparing the reversibly crosslinked, water-soluble cellulose ether having at least two different ether components as claimed in claim 1, which comprises the steps
   a) treating a cellulose or a cellulose ether with aqueous alkali metal hydroxide,
   b) reacting the alkalized cellulose with i) ethylene oxide, propylene oxide and/or an alkyl halide and/or 2-chloroacetic acid or the sodium salt of 2-chloroacetic acid and ii) with 2,3-epoxypropanol or 3-chloropropane-1,2-diol, or reacting the alkalized cellulose ethers with 2,3-epoxypropanol or 3-chloropropane-1,2-diol, thereby forming 2,3-dihydroxypropyl ether groups,
   c) optionally washing the product obtained in step b),
   d) oxidative cleaving of the vicinal hydroxy groups in the 2,3-dihydroxypropyl ether groups by treatment with periodate, periodic acid or lead tetraacetate, thereby forming 2-oxoethyl ether groups to form 2-oxoethyl cellulose ether having a DS (2-oxo-ethyl) in the range of from 0.0001 to 0.1,
   e) washing the product obtained in step d), and
   f) drying of the washed cellulose ether to form hemiacetal bonds between the 2-oxoethyl ether groups and hydroxy groups on the cellulose ether,
   wherein, the alkalization and the etherification of the celluloses or the cellulose ether are carried out in a slurry process.

22. The process as claimed in claim 21, wherein the reaction of the alkalized cellulose with ethylene oxide, propylene oxide and/or an alkyl halide occurs simultaneously with the reaction with the 2,3-epoxypropanol or the 3-chloropropane-1,2-diol.

23. The process as claimed in claim 21, wherein the reaction of the alkalized cellulose with the 2,3-epoxypropanol or the 3-chloropropane-1,2-diol is carried out immediately after the reaction with the ethylene oxide, propylene oxide and/or alkyl halide.

24. The process as claimed in claim 23, wherein the reaction of the alkalized cellulose with the 2,3-epoxypropanol or the 3-chloropropane-1,2-diol is carried out immediately after the reaction with the ethylene oxide, propylene oxide and/or alkyl halide in the same reaction vessel.

25. The process as claimed in claim 21, wherein the oxidative cleaving is carried out at a temperature of from 10 to 60° C. for a period of time of from 30 minutes to 10 hours.

26. The process as claimed in claim 21, wherein the oxidative cleaving is carried out at a pH of from 5 to 7 without polymer degradation.

27. The process as claimed in claim 21, wherein the cellulose ether in step a) is methyl cellulose, methyl hydroxyethyl cellulose, methyl hydroxypropyl cellulose, hydroxyethyl cellulose, hydroxyethyl carboxymethyl cellulose, carboxymethyl cellulose or hydroxypropyl cellulose.

* * * * *